United States Patent
Hong

(10) Patent No.: US 9,292,375 B2
(45) Date of Patent: Mar. 22, 2016

(54) MEMORY MANAGEMENT METHOD AND APPARATUS FOR RECEIVING MULTI CHANNEL HYBRID AUTOMATIC REPEAT REQUEST (HARQ) PACKET

(71) Applicant: Electronics and Telecommunications Research Institute, Daejeon (KR)

(72) Inventor: Tae Chul Hong, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 171 days.

(21) Appl. No.: 13/826,499

(22) Filed: Mar. 14, 2013

(65) Prior Publication Data

US 2014/0068396 A1 Mar. 6, 2014

(30) Foreign Application Priority Data

Sep. 4, 2012 (KR) .................. 10-2012-0097490

(51) Int. Cl.
| | |
|---|---|
| *G06F 11/00* | (2006.01) |
| *G06F 11/08* | (2006.01) |
| *H04L 1/00* | (2006.01) |
| *H04L 1/18* | (2006.01) |

(52) U.S. Cl.
CPC .............. *G06F 11/08* (2013.01); *H04L 1/0023* (2013.01); *H04L 1/1835* (2013.01); *H04L 1/1864* (2013.01); *H04L 1/1887* (2013.01)

(58) Field of Classification Search
CPC .... H04L 1/0061; H05K 999/99; G06F 11/10; G06F 11/1008; G06F 11/1076
USPC ........................................... 714/799
See application file for complete search history.

(56) References Cited

U.S. PATENT DOCUMENTS

| | | |
|---|---|---|
| 2008/0045141 A1* | 2/2008 | Suga .................. 455/7 |
| 2008/0077837 A1* | 3/2008 | Lohr et al. ........... 714/748 |
| 2008/0301514 A1* | 12/2008 | Ma et al. ............. 714/748 |
| 2009/0059801 A1* | 3/2009 | Garrett et al. ........ 370/242 |
| 2009/0228755 A1* | 9/2009 | Franovici ............ 714/751 |
| 2010/0220608 A1* | 9/2010 | Skillermark et al. .... 370/252 |
| 2011/0242966 A1 | 10/2011 | Van Caenegem |
| 2013/0039299 A1* | 2/2013 | Papasakellariou .... H04L 1/0073 370/329 |
| 2013/0201932 A1* | 8/2013 | Ko ................. H04L 1/0061 370/329 |
| 2013/0322334 A1* | 12/2013 | Wasily ............. 370/328 |

FOREIGN PATENT DOCUMENTS

| | | |
|---|---|---|
| EP | 2384047 A1 | 11/2011 |
| KR | 10-0868775 | 11/2008 |
| KR | 10-0981500 | 9/2010 |

* cited by examiner

*Primary Examiner* — Albert Decady
*Assistant Examiner* — Enam Ahmed
(74) *Attorney, Agent, or Firm* — Nelson Mullins Riley & Scarborough LLP; Anthony A. Laurentano; Lewis Lee

(57) ABSTRACT

A memory management method for receiving a multi channel hybrid automatic repeat request (HARQ) packet may enable smooth communication and reduce costs by maintaining a small memory size of a receiver in a communication system using a HARQ including a plurality of channels.

2 Claims, 11 Drawing Sheets

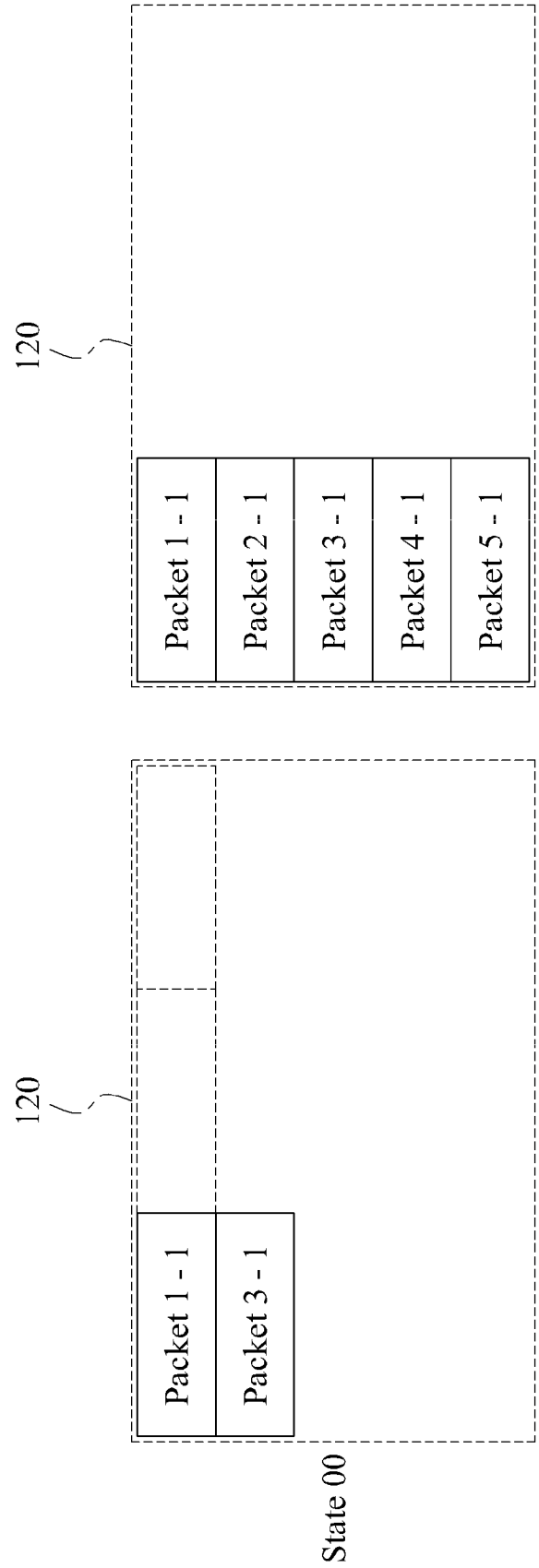

MEMORY MANAGEMENT METHOD AND APPARATUS FOR RECEIVING MULTI CHANNEL HYBRID AUTOMATIC REPEAT REQUEST (HARQ) PACKET

CROSS-REFERENCE TO RELATED APPLICATION

This application claims the priority benefit of Korean Patent Application No. 10-2012-0097490, filed on Sep. 4, 2012, in the Korean Intellectual Property Office, the disclosure of which is incorporated herein by reference.

BACKGROUND

1. Field of the Invention

The present invention relates to a method and apparatus for implementing and managing a limited receiving memory of a hybrid automatic repeat request (HARQ) in a communication system to which a multi channel HARQ is applied.

2. Description of the Related Art

A hybrid automatic repeat request (HARQ) is a scheme in which a forward error correction (FEC) scheme and an automatic repeat request are combined. The FEC scheme uses a technique for receiving precise information by correcting an error occurring in a wireless channel using an error correcting symbol. The automatic repeat request is a scheme for requesting a transmitter from a receiver to retransmit a packet and for receiving a retransmitted packet when an error occurs in a wireless channel. In general, the HARQ scheme may attempt to correct an error with respect to a received symbol, and determine whether retransmission is to be performed using a simple error detection symbol, for example, a cyclic redundancy check (CRC). As it pertains to the retransmission, the HARQ scheme may include the following four types.

1) Type-I HARQ scheme: A receiver may discard a packet having an error, request retransmission, and a transmitter may transmit a packet identical to a packet transmitted initially.

2) Type-I HARQ scheme with Chase Combining: A method for decoding a packet having an error by combining the packet in which the error is present with a retransmitted packet in lieu of discarding the packet in which the error is present.

3) Type-II HARQ scheme (Incremental redundancy scheme): In a case of Type-I, a method for transmitting by channel coding at a high coding rate in an initial transmission to prevent an unnecessary redundancy from being transmitted during initial transmission of a packet, and gradually transmitting an additional redundancy when retransmission is requested.

4) Type-III HARQ scheme (Partial incremental redundancy scheme): A method for enhancing error correction efficiency of a receiver in which a transmitter transmits a packet by channel coding at a high coding rate during initial transmission of the packet, and transmits systematic bits and parity bits in a pattern differing from the initial transmission when retransmission is requested.

The HARQ scheme may be adopted in most mobile communication systems subsequent to a third generation (3G) system. The Type-II and type-III HARQ schemes may require a receiving buffer, or a memory, of a receiver unlike an existing automatic repeat request or the type-I HARQ scheme. In particular, an existence of a sufficient receiving buffer is required since decoding may be attempted by combining a packet being retransmitted while storing a packet initially received.

In a case of an N-Channel stop-and-wait (SAW) HARQ being used in the mobile communication system subsequent to the 3G system, since an N number of HARQ processes are transmitted simultaneously by including an initial transmission packet or a retransmission packet, a receiver may be required to have a sufficient memory for simultaneous processing of a plurality of packets transmitted through the N number of HARQ processes. In a case of a terrestrial mobile communication, an operation may be performed by eight HARQ processes due to a relatively short propagation delay time. However, in a case of a satellite communication that has a relatively long round trip delay time, approximately 500 HARQ processes may be required for geosynchronous (GEO) communication in particular, because a round trip delay time is approximately 500 milliseconds. In this instance, a relatively great receiving memory may be required in comparison to a terrestrial mobile communication system.

FIG. 1 is a diagram illustrating a size of a receiving memory required for an N number of HARQ processes according to a related art. Referring to FIG. 1, space may be required for storing a k number of packets transmitted individually for a plurality of processes when a maximum number of HARQ retransmissions is assumed to be k−1. In a case of a GEO-based satellite communication system requiring approximately 500 processes for seamless transmission, an issue in which a memory size of the receiver is required to be increased may arise, for example, to 62 times greater when compared to third generation partnership project (3GPP) long-term evolution (LTE) mobile communication system, because a memory size required for a receiver increases in proportion to a number of HARQ processes.

SUMMARY

An aspect of the present invention provides a memory management method and apparatus for receiving a multi channel hybrid automatic repeat request (HARQ) packet that allows for smooth communication while maintaining a memory size of a receiver to be small in a communication system in which an HARQ is applied to a plurality of channels.

According to an aspect of the present invention, there is provided a memory management method for receiving a multi channel hybrid automatic repeat request (HARQ) packet, the method including storing a received multi channel HARQ packet in a temporary memory, determining an occurrence of an error by decoding the multi channel HARQ packet, determining a priority with respect to the multi channel in which an error occurs, based on a result of the determination, and storing the multi channel HARQ packet in which the error occurs, based on the determined priority.

The determining of the priority may include dividing the multi channel HARQ packet in which the error occurs into a primary packet to which a memory area required for storing, corresponding to a maximum number of retransmissions, is assigned, and a secondary packet to which a memory area smaller than the memory area assigned to the primary packet is assigned.

A number of primary packets may be fewer than a number of multi channel HARQ packets being received simultaneously.

The memory management method for receiving the multi channel HARQ packet may further include deleting the primary packet stored in the storing memory when a packet stored as the primary packet is retransmitted and an occurrence of an error is absent in decoding.

The secondary packet may fail to further store a packet retransmitted afterwards.

The memory management method for receiving the multi channel HARQ packet may further include converting the secondary packet to the primary packet when the primary packet stored in the storing memory is deleted.

The memory assigned to the secondary packet may be a portion of the memory area assigned to the primary packet, and when necessary for storing the primary packet, the secondary packet may be deleted or moved.

The memory management method for receiving the multi channel HARQ packet may further include sending a feedback on state information indicating a plurality of erroneous HARQ packets being stored in a storing memory to a transmitter using a feedback packet.

The state information of the feedback packet may include information relating to whether a memory area for storing a new erroneous packet is available in the storing memory.

The state information may indicate a repeat request of a packet identical to a retransmission erroneous packet, or a transmission request of an initial transmission packet.

The state information may be used for adjusting a scheduling priority of a packet to be newly transmitted or a retransmission packet and determining a modulation and coding scheme (MCS) level.

According to an aspect of the present invention, there is provided an apparatus for receiving a multi channel HARQ packet, the apparatus including a temporary memory to store a multi channel HARQ packet received from a transmitter, a decoding unit to decode the multi channel HARQ packet stored in the temporary memory, a storing memory to store the multi channel HARQ packet in which the error occurs, based on the control of the control unit, and a control unit to determine a priority with respect to a multi channel HARQ packet in which an error occurs during the decoding.

The control unit may divide the erroneous packet into a primary packet of a high priority to which a memory area required for storing, corresponding to a maximum number of retransmission is assigned, and a secondary packet to which a memory area smaller than a memory area assigned to the primary packet is assigned.

A number of primary packets may be fewer than a number of multi channel HARQ packets being received simultaneously.

The control unit may control deleting of the primary packet stored in the storing memory when a packet stored as the primary packet is retransmitted and an occurrence of an error is absent in decoding.

The control unit may fail to store the retransmitted packet and discard the retransmitted packet when the secondary packet stored in the storing memory is retransmitted and an error re-occurs.

The control unit may convert the secondary packet to the primary packet to be stored when the primary packet stored in the storing memory is deleted.

The control unit may store the secondary packet in an available memory area within a memory area assigned to the primary packet, and when necessary for storing the primary packet, the secondary packet may be deleted or moved.

The apparatus for receiving the multi channel HARQ packet may further include a responding unit to send a feedback on state information indicating a plurality of erroneous HARQ packets being stored in a storing memory, to a transmitter using a feedback packet.

The state information may indicate whether an area for storing a new erroneous packet is available in a storing memory.

The state information may indicate a repeat request of a packet identical to a retransmission erroneous packet, or a transmission request of an initial transmission packet.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 6A is a diagram illustrating a storing memory in which a new erroneous packet is stored according to an embodiment of the present invention;

DETAILED DESCRIPTION

Figure 1:
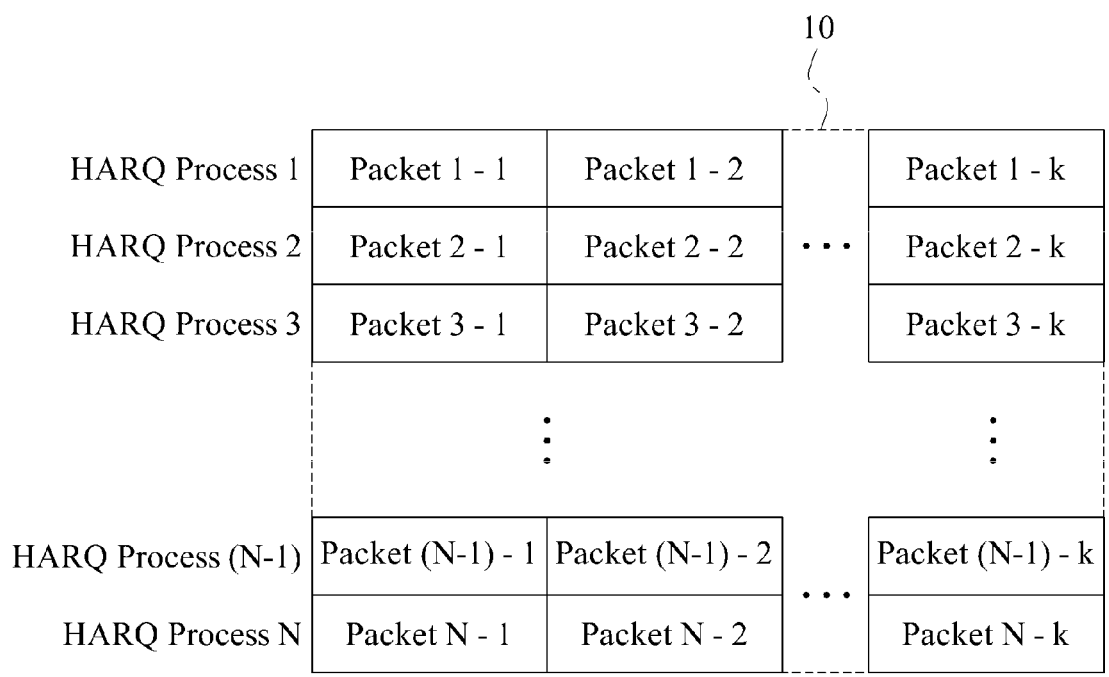
FIG. 1 is a diagram illustrating a size of a receiving memory required for an N number of hybrid automatic repeat request (HARQ) processes according to a related art.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 2:
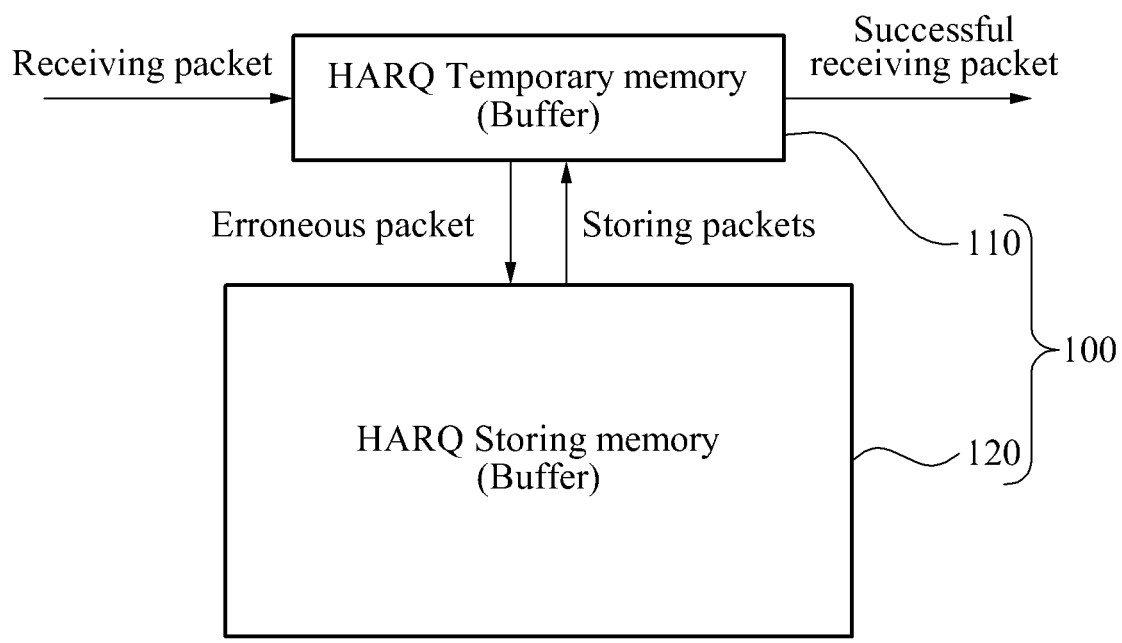
FIG. 2 is a diagram illustrating a structure of a receiving memory for an HARQ according to an embodiment of the present invention.
Figure 3:
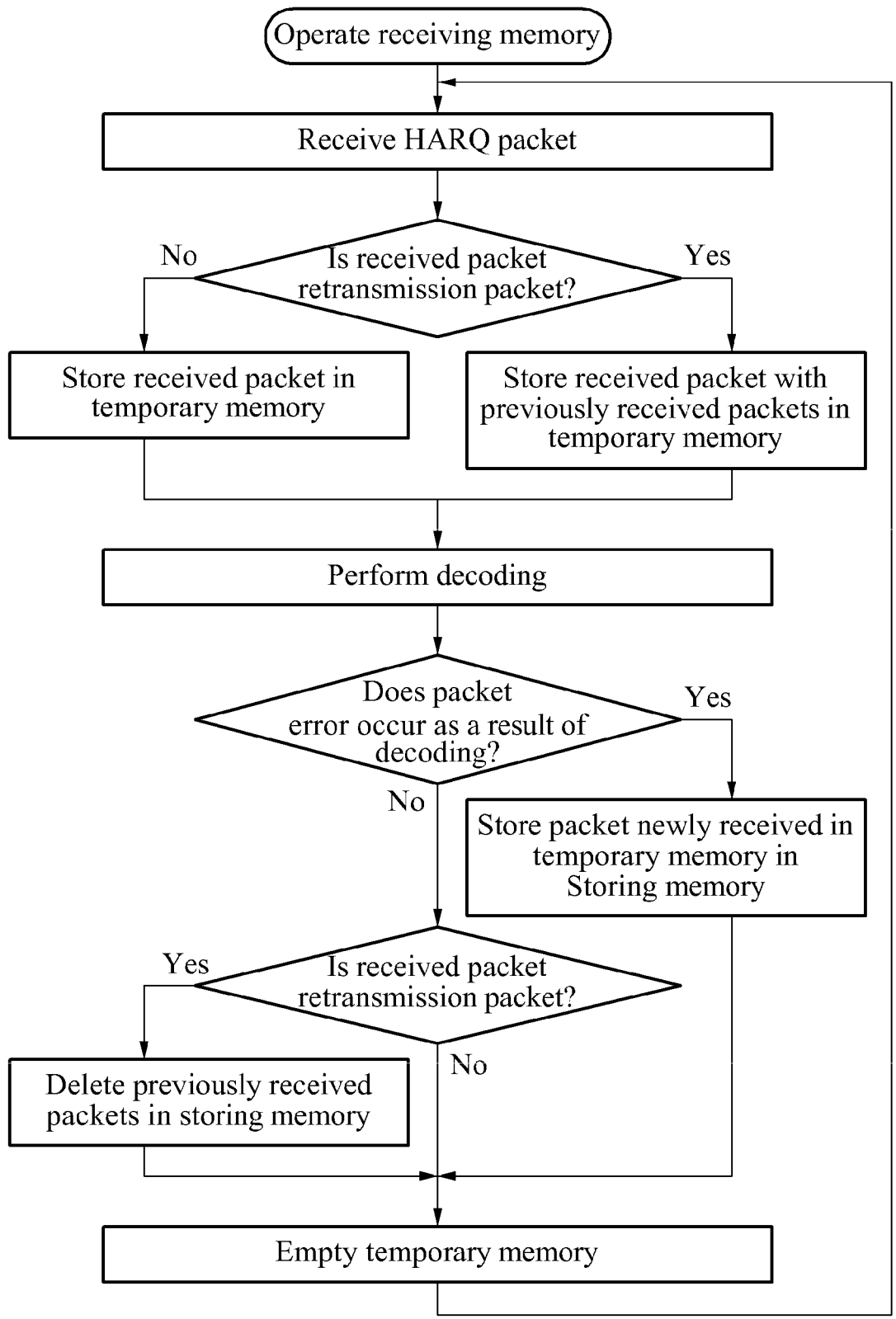
FIG. 3 is a flowchart illustrating an operation of a receiving memory of an HARQ according to an embodiment of the present invention.

FIG. 2 is a diagram illustrating a structure of a receiving memory 100 for a hybrid automatic repeat request (HARQ) according to an embodiment of the present invention. FIG. 3 is a flowchart illustrating an operation of a receiving memory 100 of a HARQ according to an embodiment of the present invention. Referring to FIGS. 2 and 3, a memory management method for receiving a multi channel HARQ packet may include storing a plurality of received multi channel HARQ packets in a temporary memory and determining an occurrence of an error by decoding the plurality of received multi channel HARQ packets, determining a storing priority with respect to a plurality of multi channel HARQ packets in which an error occurs, and storing the plurality of multi channel HARQ packets in which the error occurs, based on the determined priority.

The receiving memory 100 for a HARQ of a receiver may be managed by being divided into an HARQ temporary memory 110 to temporarily process a received packet, and an HARQ storing memory 120 to store an erroneous packet when an error occurs in a received packet. The received packet may be stored in the HARQ temporary memory 110 at first, be decoded based on a presence of an error of the received packet, and determine whether an error occurs. When an error is determined to be absent, a packet may be transferred to a subsequent operation, and when an error occurs, a storing priority may be determined, and based on the storing priority the packet may be stored in the HARQ storing memory 120. When the received packet is a retransmission packet, a presence of an error in the received packet may be determined by transferring, from the HARQ storing memory 120, an erroneous packet previously transmitted to perform decoding with the retransmission packet. In this example, the HARQ temporary memory 110 may be fixed to be a maximum memory size required for determining an error of a single packet. In particular, when an N number of HARQ processes may exist, a memory having a size of (packet size× k+storing memory) may be required rather than an existing size of (packet size×k×N). A retransmission packet may include parity bits in a case of the Type-II HARQ scheme, and in a case of the Type-III HARQ scheme, systematic bits as well as the parity bits may be included.

Referring to FIG. 3, the receiving memory 100 is operated as follows. For storing to be performed in the HARQ temporary memory 110, when a receiver receives an HARQ packet, whether a currently received packet is a retransmitted packet may be verified. When the currently received packet is verified not to be the retransmitted packet, the currently received packet may be moved to the HARQ temporary memory 110 immediately. When the currently received packet is verified to be the retransmitted packet, a plurality of previously received packets may be transferred from the HARQ storing memory 120 and stored in the HARQ temporary memory 110. Subsequently, in storing in the HARQ storing memory 120, decoding may be performed, and when an occurrence of an error is absent as a result of the decoding, whether a received packet is a retransmitted packet may be verified. When the received packet is verified to be the retransmitted packet, a stored packet of the HARQ storing memory 120 may be deleted, and the HARQ temporary memory 110 may be emptied. When the received packet is verified not to be the retransmitted packet, only the HARQ temporary memory 110 may be emptied. When an error occurs as a result of the decoding, a newly received packet in the HARQ temporary memory 110 may be stored in the HARQ storing memory 120 by dividing based on storing priority, and the HARQ temporary memory 110 may by emptied.

Figure 4:
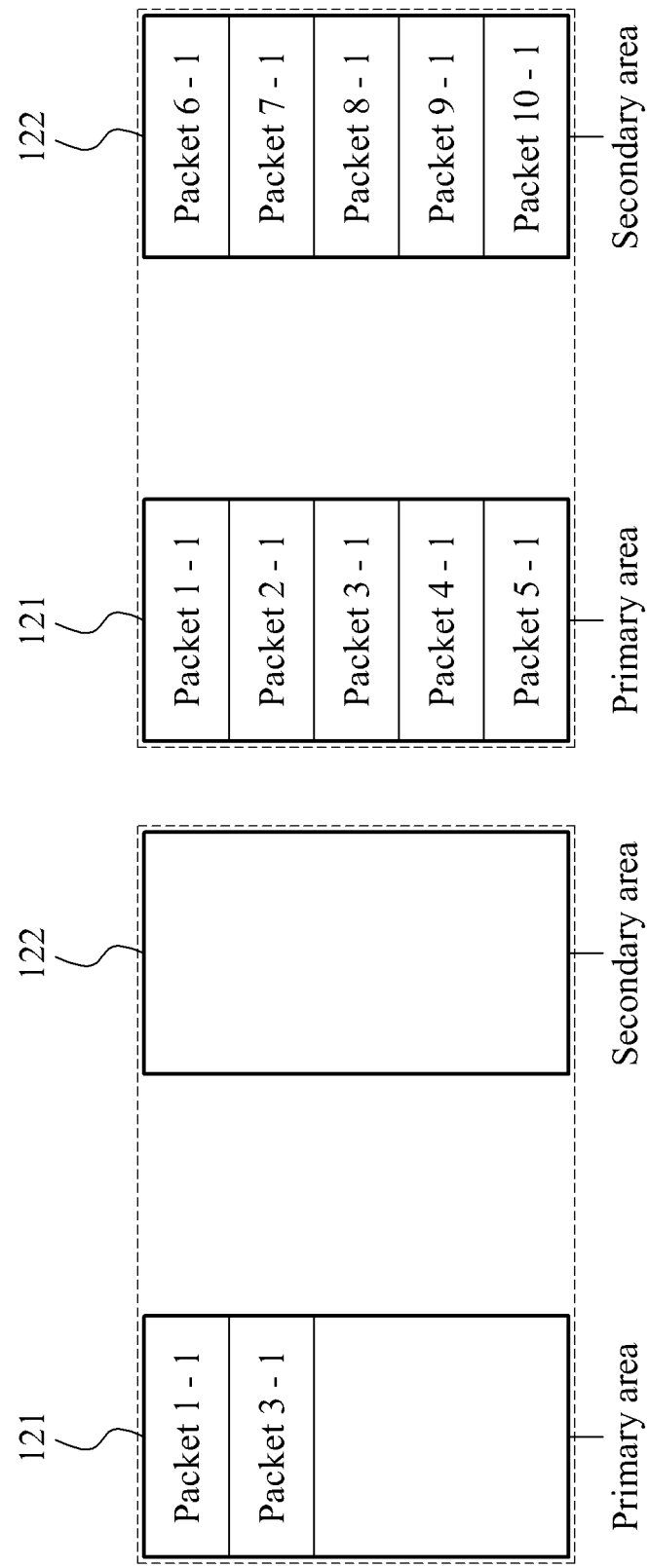
FIG. 4 is a diagram illustrating a structure in which an erroneous packet of a storing memory is stored according to an embodiment of the present invention.

FIG. 4 is a diagram illustrating a structure in which an erroneous packet of a storing memory is stored according to an embodiment of the present invention. Referring to FIG. 4, a memory management method for receiving a multi channel HARQ packet according to an embodiment of the present invention may be divided into a primary packet 121 of a high priority to which a memory, corresponding to a maximum number of retransmissions of an erroneous packet, is assigned, and a secondary packet 122 to which a memory whose size is less than a size of the memory assigned to the primary packet 121. The memory of the primary packet 121 may be associated with storing when retransmitting the erroneous packet.

According to an embodiment of the present invention, a number of primary packets 121 may be fewer than a number of multi channel HARQ packets being received simultaneously.

Figure 6B:
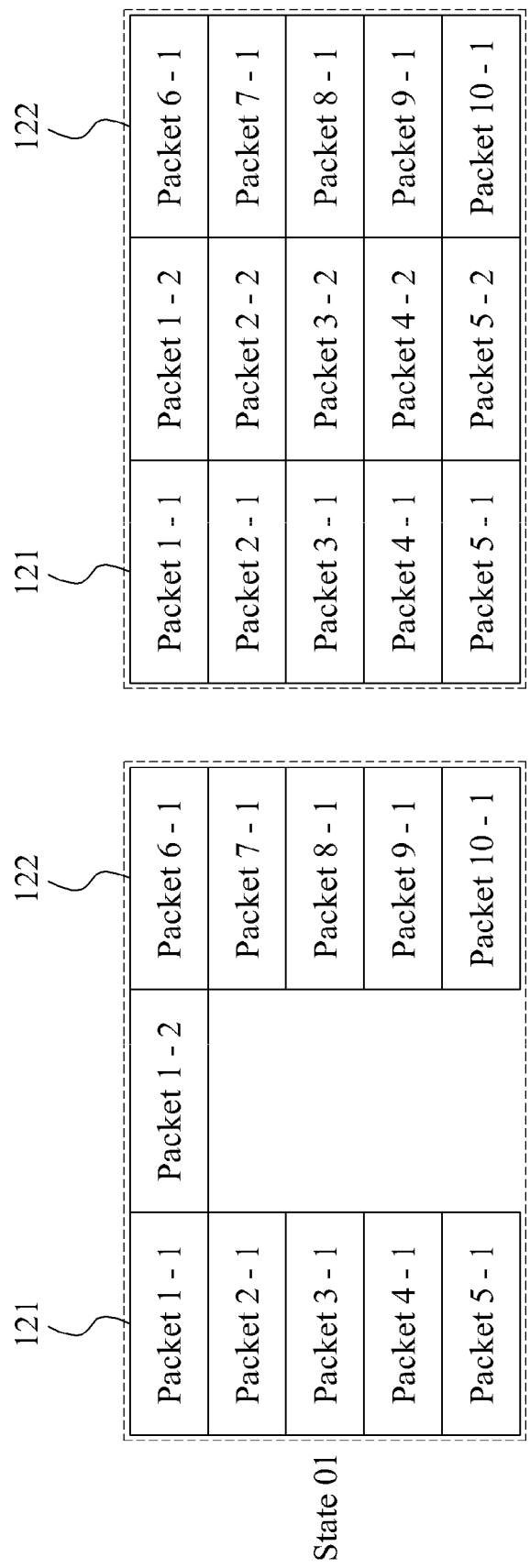
FIG. 6B is a diagram illustrating a storing memory in which a new erroneous packet fails to be stored according to an embodiment of the present invention.
Figure 7:
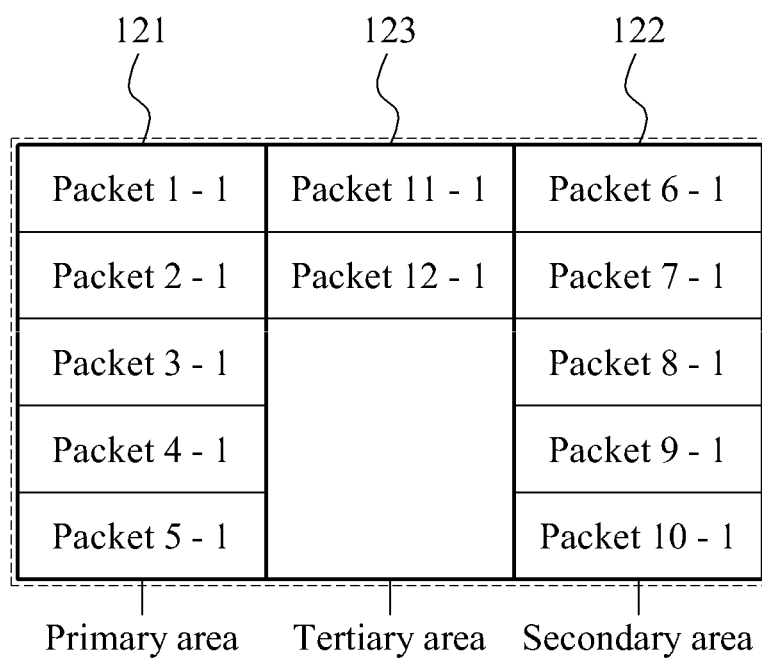
FIG. 7 is a diagram illustrating a structure in which an erroneous packet of a storing memory is stored according to an embodiment of the present invention.
Figure 8:
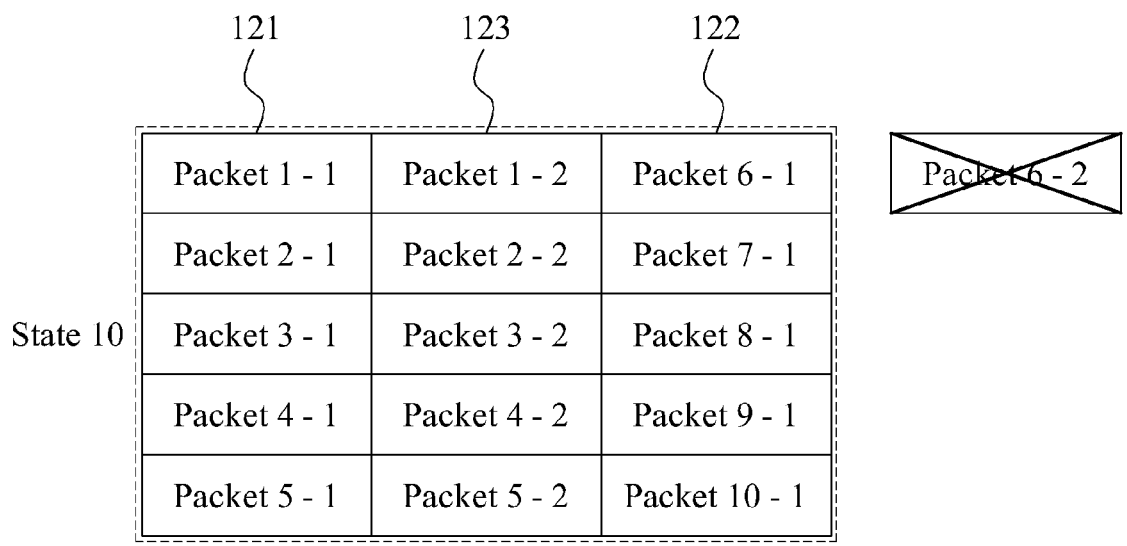
FIG. 8 illustrates an example in which an erroneous packet fails to be stored in a storing memory and deleted according to an embodiment of the present invention.

The maximum number of retransmission is assumed to be three in FIGS. 6 to 8 illustrating a method for storing in the HARQ storing memory 120 and state information.

Since the HARQ storing memory 120 of a size less than required is assumed to correspond to an N number of HARQ processes, when an error occurs in a plurality of packets, a total number of packets may fail to be stored. Accordingly, a packet in which an error occurs as shown in a structure in FIG. 4 may be stored in the HARQ storing memory 120. Referring to FIG. 4, the packet to be stored may be divided into the primary packet 121 and the secondary packet 122 based on a storing priority. Further, a tertiary packet 123 may be included. The primary packet 121 may refer to a packet to be stored in the HARQ storing memory 120 with a priority when an error occurs. Although when the primary packet 121 is retransmitted as per a maximum number of retransmissions, a total number of packets transmitted from initial transmission to retransmission may be stored in the HARQ storing memory 120. However, when the secondary packet 122 is retransmitted as per a maximum number of retransmissions, a total number of packets transmitted from initial transmission to retransmission may fail to be stored in the HARQ storing memory 120, only a portion of the total number of packets transmitted may be stored, or unlike the primary packet 121, the secondary packet 122 may fail to be stored for storing the primary packet 121. In particular, the HARQ storing memory 120 may set a portion of an N number of channels of HARQ processes to be the primary packet 121, and remaining HARQ processes may be set to be the secondary packet 122 yet to be guaranteed to be stored, such that a storing memory of a less size than required when a total of HARQ processes is retransmitted corresponding to a maximum number may be implemented.

The maximum number of retransmissions is assumed to be three in FIG. 4, and although the decoding fails in a case of a final third attempt of retransmission, a corresponding packet may be deleted rather than stored in the storing memory, and a storing space required for the HARQ storing memory 120 may correspond to a size of three packets for a single packet or a single process.

The secondary packet 122 may be stored by borrowing a portion of space of the primary packet 121 for storing a retransmission packet, and may fail to store a packet retransmitted afterwards. Accordingly, referring to FIG. 4, subsequent to five primary packets 121 from packet 1 to packet 5 being filled, remaining packets may be stored as the secondary packet 122. The secondary packet 122 may fail to store a retransmission packet of the secondary packet 122 in the HARQ storing memory 120 additionally unlike the primary packet 121. However, when the decoding of the primary packet 121 is successful and is deleted from the HARQ storing memory 120, an erroneous packet stored in a secondary packet 122 area may be converted to be a primary packet 121 area to be stored. In this instance, packets retransmitted afterwards may be stored as the primary packet 121. The tertiary packet 123 may be stored by borrowing a portion of space for storing a retransmission packet of the primary packet 121, and may be in an extended from of the secondary packet 122.

Figure 5:
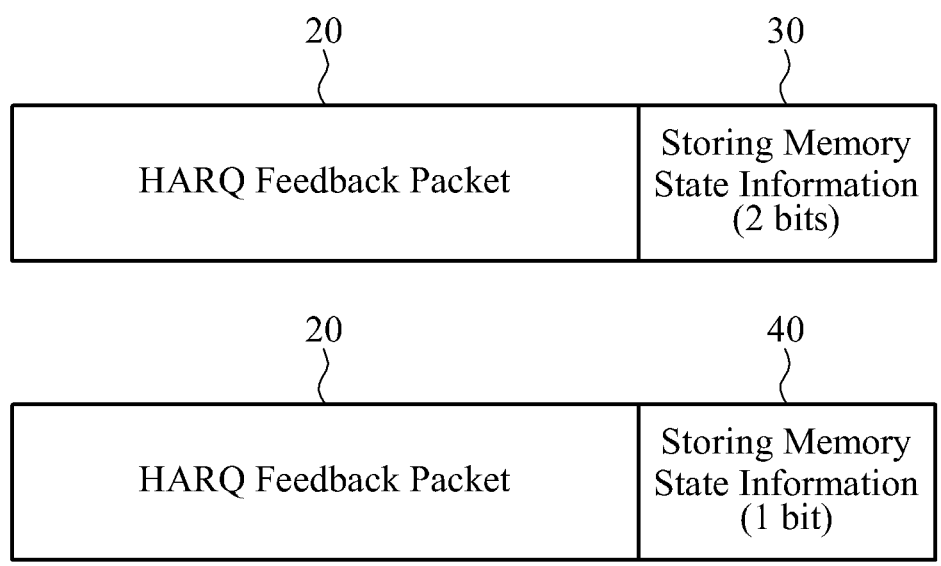
FIG. 5 is a diagram illustrating an HARQ feedback packet including receiving memory information according to an embodiment of the present invention.

FIG. 5 is a diagram illustrating a HARQ feedback packet including receiving memory information according to an embodiment of the present invention.

FIG. 5 is a diagram illustrating an HARQ feedback packet 20 including receiving memory information according to an embodiment of the present invention. Referring to FIG. 4, the memory management method for receiving a multi channel HARQ packet may further include sending a feedback, by a plurality of HARQ packets in which an error occurs, of state information stored in the storing memory to a transmitter using the HARQ feedback packet 20.

The state information configured by 1 bit or 2 bits may be transmitted along with acknowledgement/negative acknowledgement (ACK/NACK), and transmitted along with other control information through a physical uplink control channel (PUCCH) in a long-term evolution (LTE) mobile communication system.

The state information included in the HARQ feedback packet 20 may indicate whether an area for storing a new erroneous packet remains in a storing memory.

The state information of the HARQ feedback packet 20 may indicate a repeat request identical to a retransmitted erroneous packet, or a transmission request for an initial transmission packet.

The HARQ feedback packet 20 may be prepared for an instance in which an erroneous packet fails to be stored due to an insufficient size of the HARQ storing memory 120 in an instance of a great number of occurrences of the erroneous packet. More particularly, state of the HARQ storing memory 120 may be sent by adding the storing memory state information 2 bits 30 or the storing memory state information 1 bit 40 to the HARQ feedback packet to manage a memory of a receiver for a HARQ. The state of the HARQ storing memory 120 may be managed in a base station or a terminal through the storing memory state information 2 bits 30 and storing memory state information 1 bit 40.

The state information stored in the HARQ storing memory 120 in 2 bits may be represented in Table 1. Referring to Table 1, 00 may refer to a first state in which space to store a new erroneous packet in the HARQ storing memory 120 is present, 01 may refer to a second state in which space to store a new erroneous packet in the HARQ storing memory 120 is absent, 10 may refer to a third state in which an erroneous packet corresponding to a feedback packet currently being transmitted fails to be stored in the HARQ storing memory 120. Accordingly, a transmitter that receives such a feedback packet may retransmit an erroneous packet identical to a packet in which an error occurs afterwards. 11 may refer to a fourth state in which an erroneous packet corresponding to a feedback packet currently being transmitted may be resumed from an initial transmission rather than a redundant transmission. The transmitter may transmit the initial transmission packet rather than the retransmitted packet.

Since instances of 00 and 01 among 2 bit information may refer to information enabling an efficient operation through a scheduler, only state 10 and state 11 may be fedback in 1 bit when detailed information about a state is unnecessary. In a case of being configured by 1 bit, when the state of the HARQ storing memory 120 differs from the state 00 and the state 01, the state of the HARQ storing memory 120 may be transmitted while excluding bits about information of the HARQ storing memory 120.

TABLE 1

| Display of state (2 bits) | Definition |
|---|---|
| 00 | A new erroneous packet may be stored in an HARQ storing memory 120. (First state) |
| 01 | A new erroneous packet may fail to be stored in an HARQ storing memory 120. (Second state) |

TABLE 1-continued

| Display of state (2 bits) | Definition |
|---|---|
| 10 | An erroneous packet corresponding to a feedback packet currently being transmitted is not stored in an HARQ storing memory 120. (Third state) |
| 11 | A packet associated with a feedback packet currently being transmitted may be retransmitted from an initial transmission packet. (Fourth state) |

FIG. 6A is a diagram illustrating the HARQ storing memory 120 in which a new erroneous packet is stored according to an embodiment of the present invention. Referring to FIG. 6A, a space for storing a new erroneous packet as the state 00 in the HARQ storing memory 120 exists. A drawing on a left-hand side of FIG. 5 illustrates a state in which a new erroneous packet may be stored as the primary packet 121, and a drawing on a right-hand side of FIG. 5 illustrates a state in which a new erroneous packet may be stored as the secondary packet 122.

FIG. 6B is a diagram illustrating a storing memory in which a new erroneous packet fails to be stored according to an embodiment of the present invention. Referring to FIG. 6B, a number of packets available to be set as the primary packet 121 may be a total of five, being a number of rows, and packet 1 to packet 5 may be set. Also, a number of packets available to be set as the secondary packet 122 may be five, and packet 6 to packet 10 may be set, Accordingly, when a new erroneous packet, for example, a packet 11, exists, a space for storing the new erroneous packet may be unavailable.

According to an embodiment of the present invention, when an occurrence of an error is absent through a packet stored as the primary packet 121 being retransmitted, deleting the primary packet 121 stored in a storing memory may further be included. Accordingly, when an error is resolved by decoding the primary packet 121 with a retransmission packet in a state as shown in FIG. 6B, a new erroneous packet may be re-stored since the primary packet 121 stored may be deleted, and new storing space may be created. In particular, when the primary packet 121 stored in the storing memory may be deleted, the secondary packet 122 may be converted to the primary packet 121.

A memory assigned to the secondary packet 122 may set an area separate from a memory area assigned to the primary packet 121. However, a portion of the memory area assigned to the primary packet 121 may be applied to be implemented for the memory assigned to the secondary packet 122.

Figure 9:
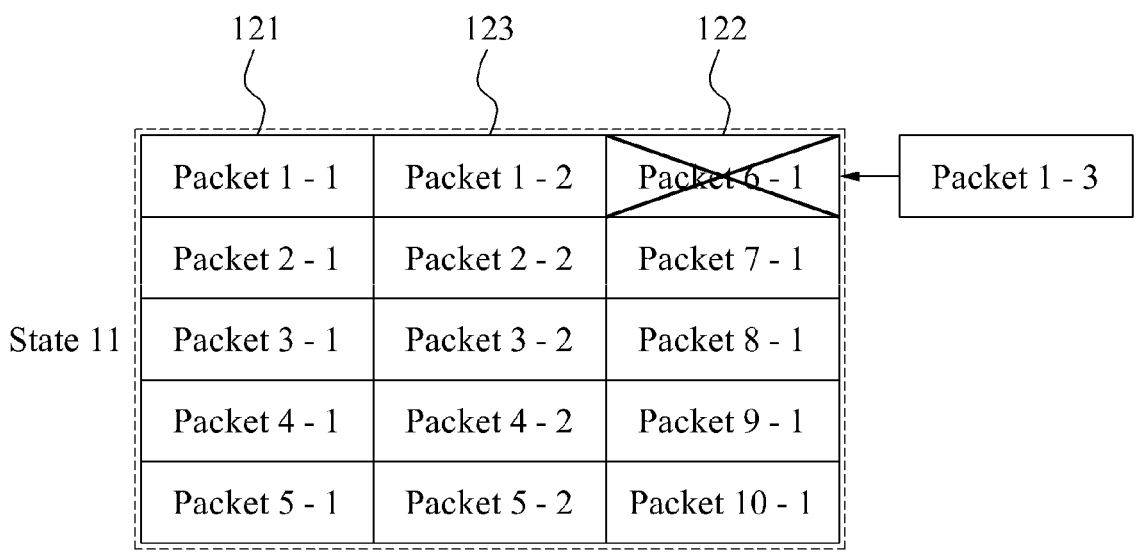
FIG. 9 illustrates an example in which a packet stored in a storing memory is deleted and an erroneous packet is stored according to an embodiment of the present invention.

When an available portion of the memory area assigned to the primary packet 121 is set to be a storing area for the secondary packet 122 to be implemented, and the storing area is required for storing the primary packet 121 continuously being retransmitted, the secondary packet 122 may be deleted or moved as shown in FIG. 9.

Referring to FIG. 7, a type of packet stored may be extended based on a maximum number of retransmission. In particular, a tertiary packet having a lower storing priority than the primary packet 121 and the secondary packet 122 may be set based on a priority, such that various priorities may be available. Aside from a case of the primary packet 121, a parity bit corresponding to a retransmission packet may fail to be stored, and a sequential order of deletion for storing the retransmission packet or the parity bit of the primary packet 121 may be deleted from a bottom of the sequential order. In FIG. 7, when a retransmission packet 1-2 for a packet 1 may need to be stored, a packet 11-1 stored in the tertiary packet 123 may be deleted. Subsequently, when a new retransmission packet 1-3 may need to be stored, a packet 6-1, being the secondary packet 122, may be deleted. However, when the packet 11-1, being the tertiary packet, may need to be deleted, and space for another tertiary packet 123 aside from a packet 1-1 or space for the secondary packet 122 may be available, a packet may be moved to the space, in lieu of being deleted. When the packet 1-1 may be successful in decoding, the secondary packet 122 may be converted to the primary packet 121.

FIG. 8 illustrates an example in which an erroneous packet fails to be stored in a storing memory and deleted according to an embodiment of the present invention. Referring to FIG. 8, a packet newly received as the state 10 may fail to be stored and deleted. In FIG. 8, a retransmission packet 6-2 of a packet 6-1, being the secondary packet 122, may be received, and a result of combining and decoding the packet 6-1 and the packet 6-2 may be a state in which an error occurs. In this instance, a retransmission packet of the secondary packet 122 may fail to be stored and deleted, and state information included in a corresponding feedback packet may be the state 10, and request a transmitter to retransmit the packet 6-2.

FIG. 9 illustrates an example in which a packet stored in the HARQ storing memory 120 is deleted and an erroneous packet is stored according to an embodiment of the present invention. Referring to FIG. 9, an existing packet stored may be deleted and a packet newly received may be stored to store the newly received packet as the state 11. In an instance of the HARQ storing memory 120 in FIG. 9, packet 1 to packet 5 may be stored as the primary packet 121, and packet 6 to packet 10 may be stored as the secondary packet 122. In this instance, when an error re-occurs and a retransmission packet is required to be stored despite reception of a second retransmission packet, being a third transmission packet, of the packet 1, a packet stored as the secondary packet 122 may be deleted and a retransmission packet stored as the primary packet 121 may be stored. In FIG. 9, information of the HARQ storing memory 120 may be set to be the state 01 to transmit a feedback packet for a packet 1-3, and information of the HARQ storing memory 120 may be set to be the state 11 to transmit a feedback packet for a packet 6-1, such that a transmitter may resume transmitting the feedback packet from initial transmission in a case of packet 6.

Figure 10:
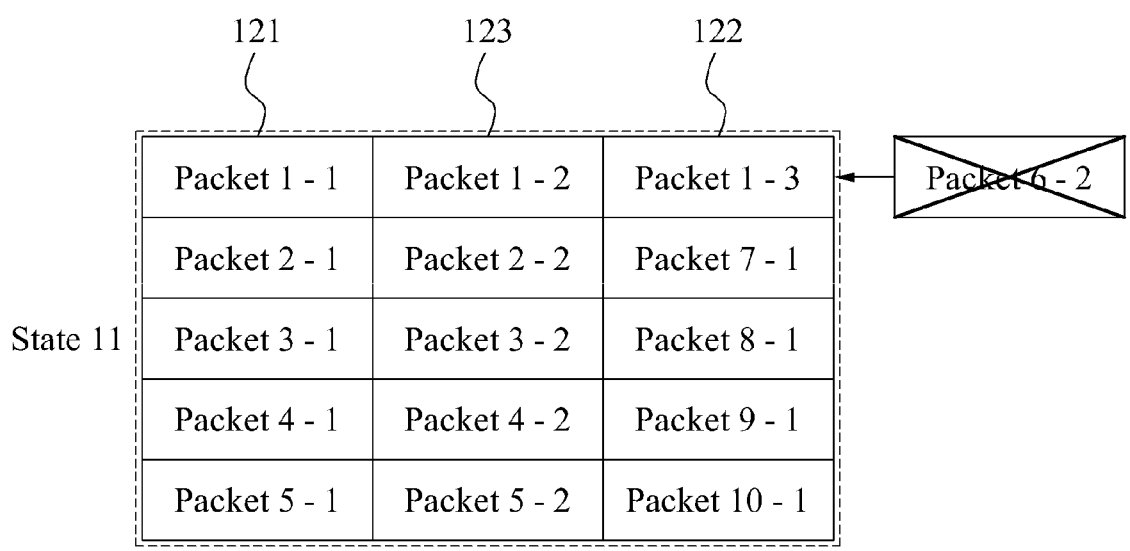
FIG. 10 illustrates an example in which a retransmission packet absent a preceding packet stored in a storing memory is received according to an embodiment of the present invention.

FIG. 10 illustrates an example in which a retransmission packet absent a preceding packet stored in a storing memory is received according to an embodiment of the present invention. Referring to FIG. 10, when a retransmitted packet is received and a packet already received is not stored in the HARQ storing memory 120, memory state information may be set to be the state 11 to be transmitted, and a transmitter may resume a packet transmitting from initial transmission. Without resuming transmitting the packet from initial transmission, necessary information may fail to be obtained through a retransmission packet transmitted afterwards.

State information included in a feedback packet may adjust a scheduling priority of a packet to be transmitted newly or a retransmission packet, and used to determine a level of a modulation and coding scheme (MCS). For example, when the state 01 is received in the feedback packet, the scheduling priority may be changed, or a stronger MCS may be used for an error. In particular, when a new erroneous packet may fail to be stored, efficiency of transmission may be enhanced by reducing a number of transmitting a packet to a corresponding terminal or employing the stronger MCS for the error. When an erroneous packet of the HARQ storing memory 120 may be deleted and state information may be fedback to be the state 00, the scheduling priority may be restored or the MCS appropriate for a channel condition may be selected.

Also, the HARQ receiving memory 100 management method of the present invention may be implemented in an apparatus. An apparatus for receiving a multi channel HARQ packet according to an embodiment of the present invention may include the HARQ temporary memory 110 to temporarily store a multi channel HARQ packet transmitted from a transmitter, a decoding unit to decode the multi channel HARQ packet stored in the HARQ temporary memory 110, the HARQ storing memory 120 to store, delete, move the multi channel HARQ packet based on being controlled by a control unit, and the control unit to determine a priority for storing a plurality of multi channel HARQ packets in which a decoding error occurs and store the plurality of multi channel HARQ in the HARQ storing memory 120.

The control unit may implement various control functions by a logical program. The control unit may divide an erroneous packet into a primary packet 121 to which a memory area required for storing corresponding to a maximum number of retransmissions is assigned, and a secondary packet 122 to which a memory area smaller than a memory area assigned to the primary packet 121 is assigned.

A number of primary packets 121 determined by the control unit is fewer than a number of multi channel HARQ packets being received simultaneously.

The control unit may control deleting of the primary packet 121 stored in the HARQ storing memory 120 when a packet stored as the primary packet 121 is retransmitted and an occurrence of an error is absent in decoding.

The control unit may fail to store the multi channel HARQ packet retransmitted in the HARQ storing memory 120 and discard the retransmitted packet when the secondary packet 122 stored in the HARQ storing memory 120 is retransmitted and an error re-occurs.

The control unit may convert the secondary packet 122 to the primary packet 121 when the primary packet 121 stored in the HARQ storing memory 120 is deleted.

The control unit may store the secondary packet 122 in an available area within a memory area assigned to the primary packet 121, and the secondary packet 122 may be deleted or moved when the memory area is required for storing the primary packet 121.

The apparatus for receiving the multi channel HARQ packet may further include a responding unit controlled by the control unit to send a feedback on state information indicating a plurality of erroneous HARQ packets being stored in the HARQ storing memory 120 to a transmitter using a feedback packet.

The state information may indicate whether an area for storing a new erroneous packet is available in the HARQ storing memory 120.

The state information may indicate a repeat request of a packet identical to a retransmission erroneous packet, or a transmission request of an initial transmission packet.

According to embodiments of the present invention, there is provided a structure and control of a receiver appropriate for a HARQ system using a plurality of channels or processes, and more particularly, an implementation of a HARQ system appropriate for a system using a greater number of channels than an LTE mobile communication system supporting eight HARQ processes in general, or having a relatively long propagation delay time such as a satellite communication system.

According to embodiments of the present invention, it is possible to reduce an implementation cost of a mobile communication receiver by maintaining storing space of a receiving memory in a receiver of a multi channel HARQ supporting an incremental redundancy scheme or a partial incremental redundancy scheme, and enhance a reliability of an overall communication system such as a low error rate.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A memory management method, the method comprising:

generating state information for indicating memory state of a receiver; and transmitting HARQ(Hybrid Automatic Retransmit Request) feedback packet including the state information to a transmitter, wherein the state information includes (i) first state in which space to store a new erroneous packet in a memory of the receiver is enough, (ii) second state in which space to store a new erroneous packet in the memory of the receiver is not enough, (iii) third state in which an erroneous packet corresponding to the HARQ feedback packet is not stored in a memory of the receiver, and (iv) fourth state in which an erroneous packet corresponding to the HARQ feedback packet is needed to retransmit from an initial transmission.

2. The method of claim 1, wherein the receiver comprises memory for managing erroneous packet received from the transmitter.

* * * * *